B. WHITTEMORE.
ROAD GRADER.
APPLICATION FILED NOV. 7, 1911.
1,117,467.
Patented Nov. 17, 1914.
3 SHEETS—SHEET 2.
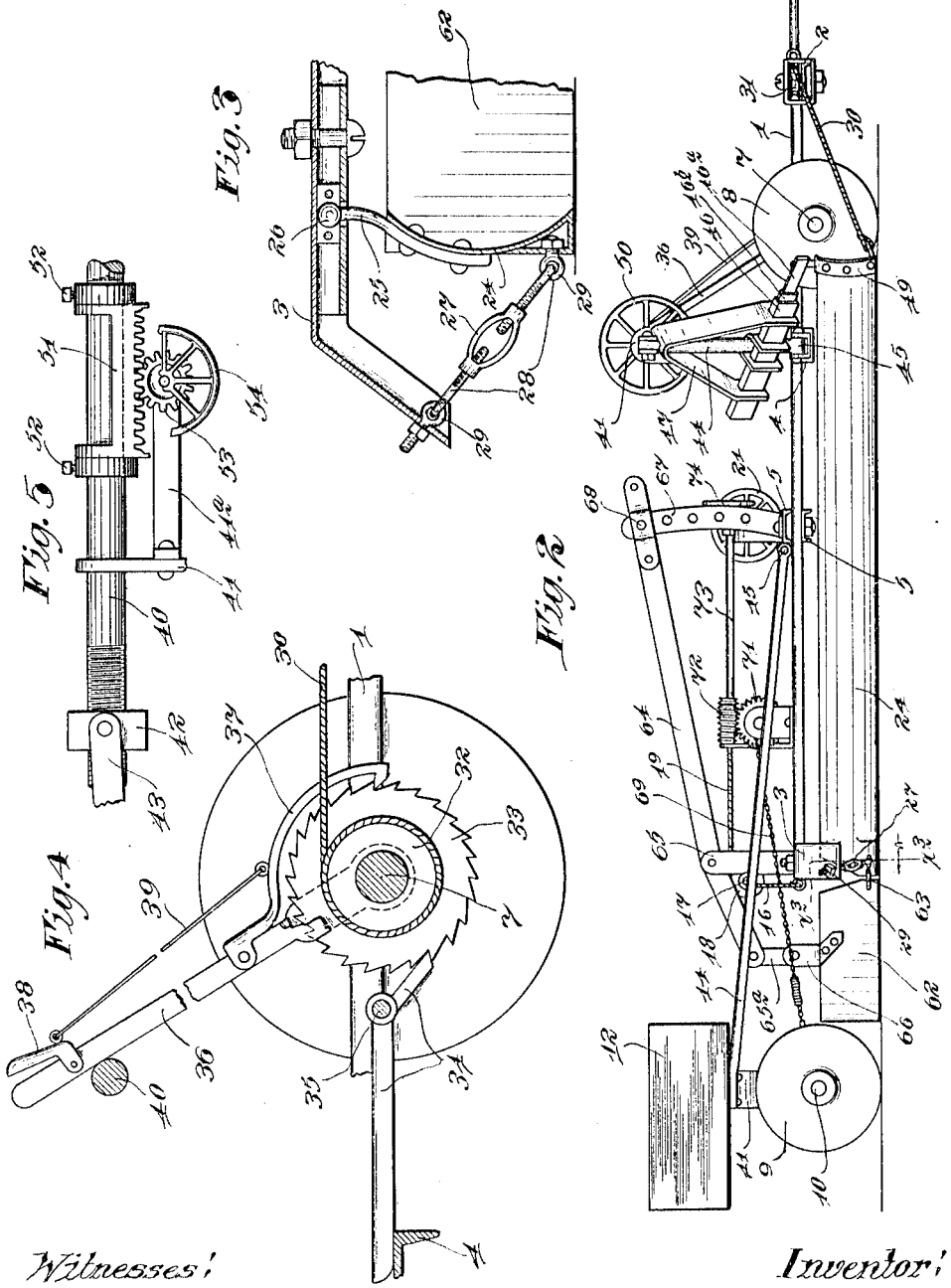
Witnesses:
Geo Knutson
E.C. Skinkle
Inventor:
Bennie Whittemore
By his Attorneys:
Williamson Merchant B. WHITTEMORE.
ROAD GRADER.
APPLICATION FILED NOV. 7, 1911.
1,117,467.
Patented Nov. 17, 1914.
3 SHEETS—SHEET 3.
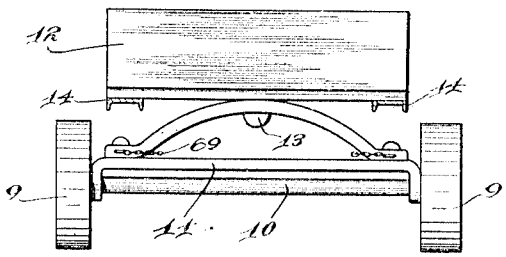
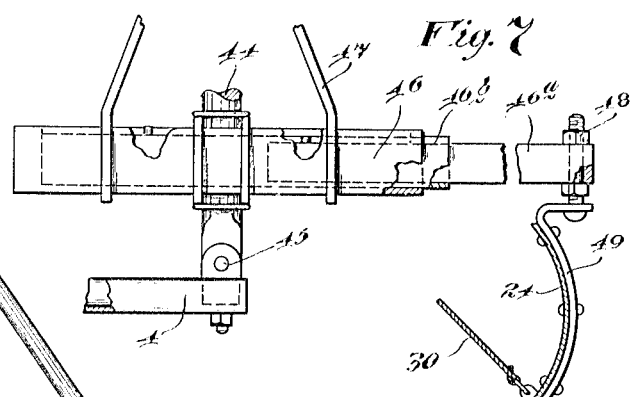
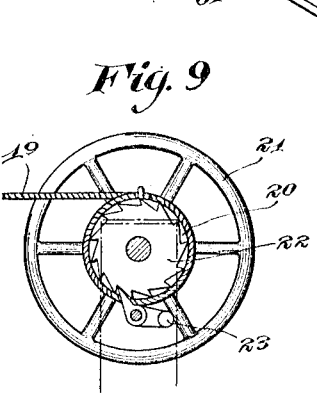
Witnesses:
Geo. Knutson
E. C. Skinkle
Inventor:
Bennie Whittemore
By his Attorneys;
Williamson Merchant

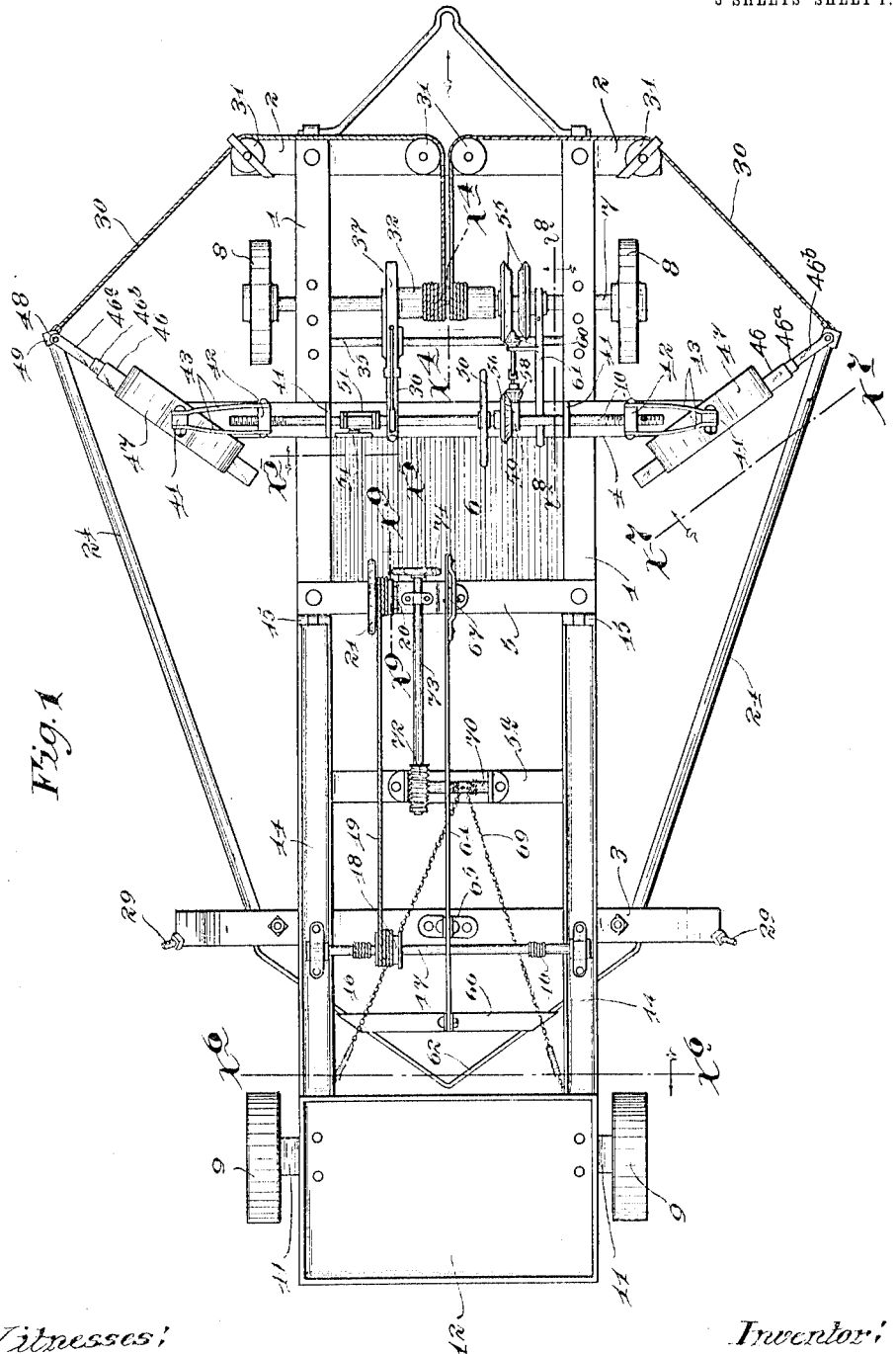

UNITED STATES PATENT OFFICE.

BENNIE WHITTEMORE, OF ALBERT LEA, MINNESOTA.

ROAD-GRADER.

1,117,467.   Specification of Letters Patent.   Patented Nov. 17, 1914.

Application filed November 7, 1911. Serial No. 659,012.

*To all whom it may concern:*

Be it known that I, BENNIE WHITTEMORE, a citizen of the United States, residing at Albert Lea, in the county of Freeborn and State of Minnesota, have invented certain new and useful Improvements in Road-Graders; and I do hereby declare the following to be a full, clear, and exact description of the invention, such as will enable others skilled in the art to which it appertains to make and use the same.

My invention has for its object to provide a highly efficient road grader, and to such ends, generally stated, the invention consists of the novel devices and combinations of devices hereinafter described and defined in the claims.

In the accompanying drawings which illustrate the preferred form of the improved road grader, like characters indicate like parts throughout the several views.

Referring to the drawings, Figure 1 is a plan view of the improved machine; Fig. 2 is a side elevation of the machine; Fig. 3 is a detail in transverse section on the line $x^3$ $x^3$ of Fig. 2; Fig. 4 is a detail in section on the line $x^4$ $x^4$ of Fig. 1; Fig. 5 is a detail in rear elevation showing parts found in the vicinity of the line marked $x^5$ $x^5$ on Fig. 1; Fig. 6 is a transverse section taken on the line $x^6$ $x^6$ of Fig. 1; Fig. 7 is a vertical section taken approximately on the line $x^7$ $x^7$ of Fig. 1; Fig. 8 is a vertical section taken approximately on the line $x^8$ $x^8$ of Fig. 1; and Fig. 9 is a detail in vertical section taken on the line $x^9$ $x^9$ of Fig. 1.

The main frame of the grader is preferably, and as shown, made up of a pair of side bars 1, a front end tie bar 2, rear end tie bar 3, and intermediate tie bars 4, 5 and 5ª. The operator's platform 6 is connected to and between the said tie bars 4 and 5. The front axle 7 is journaled in suitable bearings on the side bars 1 at the rear of the front tie bar 2, and it is provided with wheels 8 secured to its projecting ends. The rear wheels 9 are carried by the ends of a rear axle 10, journaled in the frame 11, of a small rear truck having, as shown, a body 12, of box-like form, to which the said axle is pivoted at 13.

The truck body 12 is rigidly secured to the rear end of supplemental frame bars 14 that overlie the rear portions of the main frame bars 1, project rearward thereof, and at their front ends, are connected to the intermediate portions of the said frame bars 1 by hinge joints 15. The rear end of the main frame is adapted to be raised and lowered by a lifting device comprising a pair of cables 16 attached at their lower ends to the rear tie bar 3, and at their upper ends, secured to and wound upon a transverse windlass shaft 17, journaled in suitable bearings on the supplemental frame bars 14. The windlass shaft 17 is provided with a drum 18, on which is wound the rear end of a cable 19. The front end of said cable 19 is wound upon a sheave or drum 20, journaled to a suitable support on the intermediate tie bar 5, and provided with an operating hand wheel 21, and a ratchet wheel 22. A retaining pawl 23 coöperates with the ratchet wheel 22 to normally hold the drum 20 against backward rotation, and hence, to hold, when desired, the rear end of the main frame at different elevations, for purposes which will hereinafter appear.

On each side of the machine there is a long adjustable scraper blade, or grader bar 24, which is preferably curved in vertical cross-section. The rear ends of these scraper blades 24 (see particularly Figs. 1, 2 and 3), are provided with upwardly projecting hinge straps 25 having heads that are seated at 26 in bearings on the rear tie bar 3 of the main frame. These joints 26 permit the scraper blades 24 to swing laterally and to move vertically. To prevent the said scraper blades from swinging backward at their lower edges, under the pressure produced thereon when at work on the road, a thrust link is flexibly connected between the lower rear portion of the scraper blade, and a portion of the machine frame. Preferably also, this link is made longitudinally adjustable, so as to set the scraper blade at the desired working angle. As best shown in Fig. 3, this adjustable thrust link is made up of a turn buckle 27, reversely threaded bolts 28, and eye bolts 29, which latter connect said bolts to the said scraper blade and to the adjacent ends of the rear tie bars 3.

Adjusting cables 30 are attached to the front ends of the scraper blades 24, and these cables are passed over guide sheaves 31 on the front tie bar 2, and are brought rearward and attached to and wound upon a windlass drum 32 which, as shown, is loosely journaled on the intermediate portion of the front axle 7. At one end, said drum 32 is provided with a ratchet wheel 33 and is normally held against backward rotation by a gravity actuated retaining pawl 34 (see Fig. 4), pivoted on a transverse rod 35 secured on the main frame. Pivoted on the front axle 7 adjacent to the ratchet wheel 33 is a hand-operated lever 36 provided with a long pawl 37 for action on the ratchet wheel 33, when it is desired to wind up the cables 30 and thereby pull inward on the front ends of the scraper blades. The pawl 37 is adapted to be moved into an inoperative position, at will, by a small hand-piece 38, pivoted to the lever 36 and connected to said pawl by a rod 39. The retaining pawl 34 is adapted to be released, at will, by lifting up its long rearwardly extended end.

The free front ends of the scraper blades 24 are adjustably supported by novel means, best illustrated in Figs. 1, 2 and 7. Referring to these views, the numeral 40 indicates an adjusting shaft mounted in bearings 41 on the intermediate tie bar 4, and provided with reversely threaded ends, on which work nut blocks 42. These nut blocks 42 are connected by links 43 to the upper ends of oscillating posts 44, the lower ends of which are pivoted at 45 to suitable bearings on the ends of the tie bar 4. The posts 44 carry telescopically extensible supporting arms made up of sections 46, 46$^a$ and 46$^b$. The arm sections 46 are rigidly secured to corresponding posts 44, and to yokes 47 carried by the said posts. The said posts and yokes constitute oscillatory column brackets which carry the longitudinally extensible arms and oscillate the latter, so that the free ends of the arm sections 46$^a$ will be raised and lowered. The ends of the said arm sections 46$^a$ are connected to the free front ends of the scraper blade 24, by loose joints, preferably afforded by nut-equipped bolts 48 passed through perforated upper ends by metal straps 49 secured to the ends of the said scraper blade. When the scraper blades 24 are in engagement with the road, the weight of the load thereon tends to separate the sections 46, 46$^a$ and 46$^b$ to an extent determined by the cables 30.

The operating shaft 40 is provided at its intermediate portion with an operating hand wheel 50, by means of which it may be rotated in either direction, at will. It is obvious that when, by proper rotation with the shaft 40, the nut blocks 42 are moved farther apart, the free ends of the extensible arms, and consequently, the free ends of the scraper blades 4 will be lowered. Reverse rotation of said shaft 40 will also, of course, raise the free ends of the scraper blades.

It is sometimes desirable in grading roads, that the scraper blade on one side be raised higher than the scraper blade on the other side. To accomplish this result in a simple way, I provide means for adjusting the operating shaft 40 bodily endwise in either direction. This device is best shown in Figs. 1 and 5, wherein the numeral 51 indicates a rack loose on the operating shaft 40, but held for endwise movements therewith by collars 52. The shaft 40 is, of course, free for endwise movements through its bearings 41.

The numeral 53 indicates a pinion journaled to a projecting arm 41$^a$ on one of the bearings 41, and provided with an operating hand wheel 54.

By the means just described, the shaft 40 may be moved endwise, so as to simultaneously oscillate the pivoted supporting columns or brackets in reverse directions and thereby simultaneously raise the scraper blade on one side and lower the scraper blade on the other side. The free ends of the scraper blade will, of course, be forced outward as far as permitted by the cables 30, and the said cables are relied upon to draw the free front ends of the scraper blades inward or toward the machine frame, when desired. The scraper blades are, therefore, universally adjustable. That is, they are adjustable both laterally and vertically at their front ends by the means just above described, and at their rear ends are flexibly supported from the rear portion of the machine frame so as to permit all of the above noted movements, and furthermore, are vertically adjustable at their rear ends, being moved vertically when the rear portion of the main frame is vertically adjusted in respect to the supplemental frame bars 14, all as before clearly described.

Sometimes, or under some conditions, it may be desirable to impart the above rotary movements to the operating shaft 40 from the traction wheels of the machine. Hence, I have shown the front axle 7 as provided with reversely beveled friction wheels 55, and the operating shaft 40 is provided with a beveled gear 56, (see Figs. 1 and 8).

The numeral 57 indicates a flexible, longitudinally extensible shaft having at its upper end a pinion 58 that meshes with the beveled gear 56. Preferably, the extreme upper end section of the shaft 57 is journaled in a bearing 59 loosely applied on the rod 40, but held against lateral movements thereon. At its lower end, the flexible shaft 57 is provided with a beveled friction pinion 60 that is adapted to be engaged, at will, with either of the two friction wheels 55. By means of a suitable shipper lever 61 connected to the lower end of the flexible shaft 57 the friction pinion 60 may be engaged, at will, with either of the friction wheels 55, and the shaft 40 will therefore be driven in either direction under the advance movement of the machine.

The dirt scraped to the rear ends of the scraper blades 24 is delivered to a secondary scraper in the form of an L or V, and which serves as a combined leveler and filler. This secondary or auxiliary scraper 62 has the front ends of its diverging side loosely hinged to the lower rear end portions of the scraper blades 24, preferably by rings or links 63. For raising and lowering, and changing the working angle of this auxiliary scraper, a long lever 64 is intermediately pivoted to a bracket 65 on the rear frame tie bar 3, and the lower end of this lever is, as shown, connected by a short link 64ᵃ to a cross bar 66, spanning the intermediate portion of said auxiliary scraper and secured to the upper edge thereof. The front end of the lever 64 is arranged to be adjustably secured to a lock segment 67, secured on the frame tie bar 5. As shown, the segment 67 and the end of the lever 64 are perforated, and a pin 68 is arranged for coöperation therewith. The so-called secondary or auxiliary scraper 62, when lowered, will carry a large amount of dirt forward with the machine, leveling the ground as it goes over the same by scraping off projections and depositing the dirt in depressions. By the various adjustments, it may be set to round up the road to any desired extent at the center, or to scrape the same off flat. By the coöperation of the wings or side scraper blades and this combined leveler and filler, a roadway may be properly graded in passing over the same but once with the grader.

The steering of the machine is accomplished by horizontal oscillatory adjustments of the rear axle 10, to-wit, the axle of the auxiliary truck. To this end, chains or cables 69 are attached to and extended from the opposite ends of the said axle and are attached to and reversely wound upon a small windlass shaft 70 journaled in suitable bearings on the frame bar 5ᵃ. This windlass shaft 7 is provided with a worm gear 71 that meshes with a worm 72 secured to the rear end of an operating rod 73. This operating rod 73 is mounted in suitable bearings on the frame bars 5 and 5ᵃ, and at its front end, is provided with an operating hand wheel 74.

The leveler and filler, to-wit, the V-shaped auxiliary scraper at the rear, and the main wings or scraper blades are capable of independent adjustments, and in passing over the ground each part is under perfect control of the lever, so that dirt may be let out and dropped whenever desired. Moreover, the machine adjusts itself perfectly to all conditions, so that in passing from smooth to a rough surface, it continues its work without any difficulty or extra adjustments on the part of the operator.

The numeral 75 indicates a draft yoke which, as shown, is pivotally connected to the front frame bar 2, and to which a traction engine or draft horses may be attached for the purpose of drawing the grader over the road.

What I claim is:

1. In a grader, the combination with a supporting frame and forwardly diverging main scraper blades supported by said frame with freedom for vertical adjustments and for lateral angular adjustments, an auxiliary scraper directly hinged to the rear ends of said main scraper blades and having its intermediate portion bent or bowed rearward and with freedom for angular vertical adjustments with respect to said main scraper blades, and means for vertically adjusting said auxiliary scraper, the ends of said auxiliary scraper so closely joining the rear ends of said main scraper blades as to form therewith substantially a single scraper with an adjustable intermediate section.

2. In a grader, the combination with a frame, of scraper blades connected to said frame at their rear ends with freedom for vertical and lateral angular adjustments at their front ends, an approximately V-shaped auxiliary scraper connected to the rear ends of said scraper blades with freedom for hinge-like vertical adjustments, means for vertically adjusting said auxiliary scraper, and independent means for imparting vertical and lateral angular adjustments to the front ends of said scraper blades.

3. In a grader, the combination with a frame, of scrapers connected thereto at their rear ends with freedom for vertical and lateral angular adjustments at their front ends, and means for supporting and adjusting the front ends of said scraper blades comprising extensible arms pivotally connected to said blades, supports for said arms on said frame, means for rocking said supports to vertically move the free ends of said blades, and means attached to the free ends of said blades and to the said frame for limiting the outward angular movements of said blades.

4. In a grader, the combination with a frame, of scraper blades on the opposite sides thereof connected thereto at their rear ends with freedom for vertical and lateral angular adjustments at their front ends, and means for supporting and adjusting the front ends of said blades comprising extensible arms connected to the front ends of said blades, oscillatory arm supports on said frame, means whereby said arm supports may be simultaneously adjusted in opposite directions to simultaneously raise or simultaneously lower the free ends of said blades, and adjustable cables connected to the free ends of said blades and to said frame, to limit the outward angular movements of the free ends of said blades.

5. In a grader, the combination with a frame, of scraper blades on the opposite sides thereof connected thereto at their rear ends with freedom for vertical and for lateral angular adjustments at their front ends, and means for supporting and adjusting the front ends of said blades comprising extensible arms connected to the free ends of said blades, oscillatory arm supports on said frame, connections whereby said arm supports may be simultaneously oscillated in opposite directions to simultaneously raise or simultaneously lower the free front ends of said blades, other connections whereby the said arm supports may be simultaneously oscillated in opposite directions to thereby simultaneously raise the free end of one blade and lower the free end of the other blade, and means for limiting the outward movements of said scraper blades.

6. In a grader, the combination with a frame, of scraper blades connected thereto at one end with freedom for vertical and lateral angular movements at their free ends, of means operative, at will, to simultaneously, vertically adjust the free ends of said blades in the same direction, and means whereby, at will, the free end of one scraper blade may be raised and the free end of the other blade simultaneously lowered.

7. In a grader, the combination with a frame, of scraper blades connected thereto at one end with freedom for vertical and lateral angular movements at their free ends, of means operative, at will, to simultaneously vertically adjust the free ends of said blades in the same direction, and means whereby, at will, the free end of one scraper blade may be raised and the free end of the other blade simultaneously lowered, and cable connections between the free ends of said blades and the said frame for limiting the outward angular movements of said blades.

8. In a grader, the combination with a frame, of scraper blades connected thereto at their rear ends with freedom for vertical angular and lateral adjustments at their front ends, and means for supporting and adjusting said scraper blades comprising arms connected to said blades, oscillatory arm supports on said frame, nut blocks connected to said oscillatory supports, and a shaft mounted on said frame and having reversely threaded engagement with said nut blocks, connections for rotating said shaft, at will, and connections for moving said shaft endwise at will, whereby said scraper blades may be simultaneously adjusted either in the same or in reverse directions.

9. In a grader, the combination with a main frame and a supplemental frame hinged to the intermediate portion thereof and extended rearward therefrom, truck wheels carrying said main and supplemental frames, scraper blades connected at their rear ends to said main frame with freedom for lateral angular adjustments, an auxiliary scraper connected at the rear of said scraper blades and spanning the space between the same, and connections between said main and supplemental frames for vertically adjusting the former in respect to the latter, substantially as described.

10. In a grader, the combination with a main frame and a supplemental frame hinged to the intermediate portion thereof and extended rearward therefrom, truck wheels carrying said main and supplemental frames, scraper blades hinged at their rear ends to said main frame with freedom for vertical and for lateral angular adjustments, means for vertically and laterally adjusting the free ends of said scraper blades, an approximately V-shaped auxiliary scraper connected at the rear of said scraper blades and spanning the space between the same, means for vertically adjusting said auxiliary scraper, and connections between said main and supplemental frames for vertically adjusting the former in respect to the latter, substantially as described.

11. In a grader, the combination with a main frame and truck wheels supporting the same, of a supplemental frame hinged to the intermediate portion thereof and extended rearward therefrom, a wheel-equipped axle pivotally connected to the rear portion of said supplemental frame and supporting the same, steering connections for imparting oscillatory movement to said axle, forwardly diverging scraper blades connected to said main frame, connections between said main and supplemental frames for moving the latter vertically in respect to the former, means for imparting vertical and lateral angular adjustments to the said scraper blades, and an auxiliary scraper adjustably connected at the rear of said scraper blades and spanning the space between the same, substantially as described.

In testimony whereof I affix my signature in presence of two witnesses.

BENNIE WHITTEMORE.

Witnesses:
C. L. SWENSON,
A. C. ERICKSON.